Sept. 4, 1956
B. SMITH
2,761,279
ROCKET MOTOR JUNCTURE
Filed Feb. 25, 1953
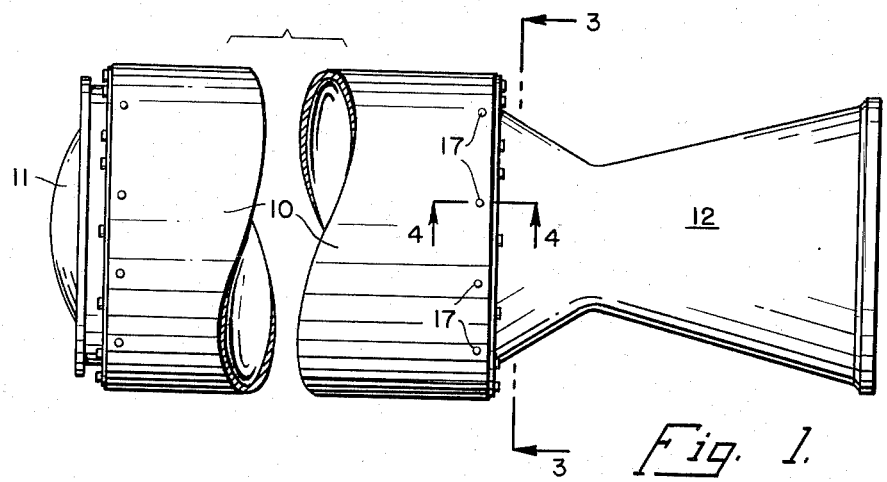
Fig. 1.
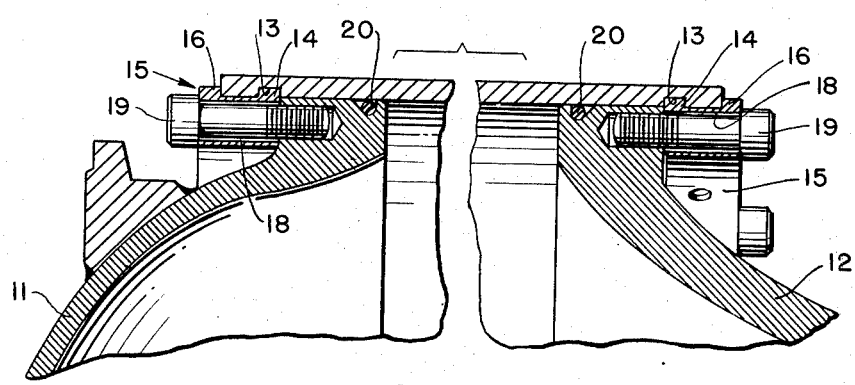
Fig. 2.
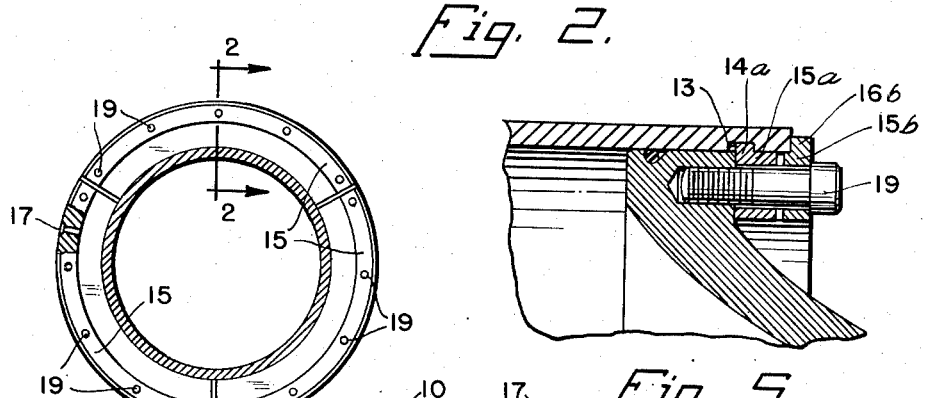
Fig. 3.
Fig. 5.
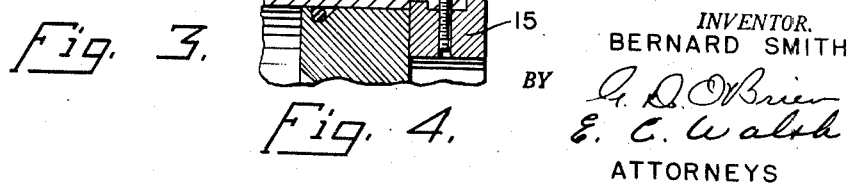
Fig. 4.
*INVENTOR.*
BERNARD SMITH
BY
*G. D. O'Brien*
*E. C. Walsh*
ATTORNEYS United States Patent Office 2,761,279
Patented Sept. 4, 1956

2,761,279
ROCKET MOTOR JUNCTURE

Bernard Smith, China Lake, Calif., assignor to the United States of America as represented by the Secretary of the Navy Application February 25, 1953, Serial No. 338,928

3 Claims. (Cl. 60—35.6)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in joints for connecting closures or the like to the ends of circular tubes and more particularly to joints for connecting exhaust nozzles and front closures to rocket motor tubes.

In large diameter rocket motors it has been the practice to attach the end closures to the motor tube by means of flange and bolt joints. These joints add undesirable weight to the rocket, are tedious to assemble and have aerodynamically rough exterior surfaces. In an attempt to obviate the foregoing disadvantages, welded joints have been employed, but these have the disadvantage that flexibility in loading propellent grains in the motor tubes has been adversely affected. Snap rings have also been employed, especially in motors of smaller diameter, but these have the disadvantage that they are not susceptible to ready inspection after assembly.

Principal objects of the invention are the provision of joints of the class referred to which are relatively light in weight, aerodynamically smooth, and may be readily assembled and inspected.

Other objects are the provision of joints which are simple in construction, easily machinable and in which tolerances are not unduly critical.

Other objects and many of the attendant advantages of this invention will be readily appreciated as the same becomes better understood by reference to the following detailed description when considered in connection with the accompanying drawings wherein:

Fig. 1 is a side elevation of a rocket motor, an intermediate portion being broken out;

Fig. 2 is an enlarged section taken on line 2—2, Fig. 3;

Fig. 3 is a section taken on line 3—3, Fig. 1;

Fig. 4 is an enlarged section taken on line 4—4, Fig. 1; and

Fig. 5 is a section, similar to Fig. 2, illustrating an alternative form of the invention.

Referring in detail to the drawing, rocket motor tube 10 is of any conventional construction which is provided at its forward end with a closure 11 and its rear end with a closure 12, the latter being in the form of an exhaust nozzle. The closures may also be of any conventional construction except at their peripheral portions where they are connected to the motor tube, as will subsequently be described. Since the connecting joints are identical for both closures, a description of one will serve for both.

An internal annular groove 13 is formed in the wall of the tube near an end thereof which receives the outwardly projecting flanges 14 of a plurality of segmental members 15 which are each provided with a similar flange 16 which abuts an end face of the tube. A plurality of angularly spaced countersunk head screws 17 extend through the wall of the tube, as best shown in Fig. 4, and threadedly engage each segment to retain it in the position shown. Each segment is provided with a plurality of angularly spaced apertures 18, through which extend screws 19, their heads abutting the outer end face of the segment and their opposite ends threadedly engaging the closure. A toroidal O ring 20 disposed in a suitable groove in each closure prevents leakage of gas along the peripheries of the closures where they telescope within the tube.

Any number of segments, in excess of one, may be employed, three being illustrated, as best shown in Fig. 3. As will be apparent, the total angular extent of the segments must be somewhat less than 360° to permit them to be inserted in the tube and thence be moved radially outward to the position shown.

In the alternative form of the invention shown in Fig. 5 each segment is formed of two parts 15a, 15b and, as will be apparent, the tightening of screws 19 draws these parts toward each other so that flange 14a engages one side wall of groove 13 and flange 16b engages an end face of the tube thus locking the closure against axial movement relative to the tube. While this construction is slightly more complicated than the first described construction the tolerances of the groove width, its position relative to an end face of the tube, or the width of flange 14a are less critical than in the first described integral segment construction.

Obviously many modifications and variations of the present invention are possible in the light of the above teachings. It is therefore to be understood that within the scope of the appended claims the invention may be practiced otherwise than as specifically described.

What is claimed is:

1. In a rocket motor including a circular motor tube having an open end, a closure member having a circular peripheral portion adapted to be inserted into the tube from said end and to telescopically engage the inner surface of the tube, an internal annular groove in the tube wall disposed substantially in a plane perpendicular to the tube axis and spaced from said end, a plurality of angularly spaced arcuate segmental members, each having a first outwardly projecting flange thereon engaging within the groove for preventing movement thereof relative to the tube in at least one direction axially of the tube and a second outwardly projecting flange abutting the end face of the tube adjacent said open end, and a plurality of bolts or the like extending through apertures in the segments, in directions substantially parallel with the tube axis, each having a portion threadedly engaging the closure and a head portion accessible from outside the tube for turning same.

2. Apparatus in accordance with claim 1 wherein each segmental member is integrally formed with the flanges disposed a predetermined distance apart.

3. Apparatus in accordance with claim 1 wherein each segmental member is formed of two parts and with one of said flanges on each part, said bolts being adapted to draw the flanges toward each other.

References Cited in the file of this patent

UNITED STATES PATENTS 2,426,526    Rutishauser et al. _____ Aug. 26, 1947